Feb. 14, 1967 O. K. PADDOCK 3,304,502

REMOTE CONTROL OF A PLURALITY OF FUNCTIONS

Filed Nov. 6, 1963

INVENTOR:
Orris K. Paddock
By Smyth, Roston & Pavitt
Attorneys

United States Patent Office 3,304,502

Patented Feb. 14, 1967

3,304,502

REMOTE CONTROL OF A PLURALITY OF FUNCTIONS

Orris K. Paddock, Pacific Palisades, Calif., assignor to Packard-Bell Electronics Corporation, Los Angeles, Calif., a corporation of California Filed Nov. 6, 1963, Ser. No. 321,851
12 Claims. (Cl. 325—391)

Figures 1, 2:
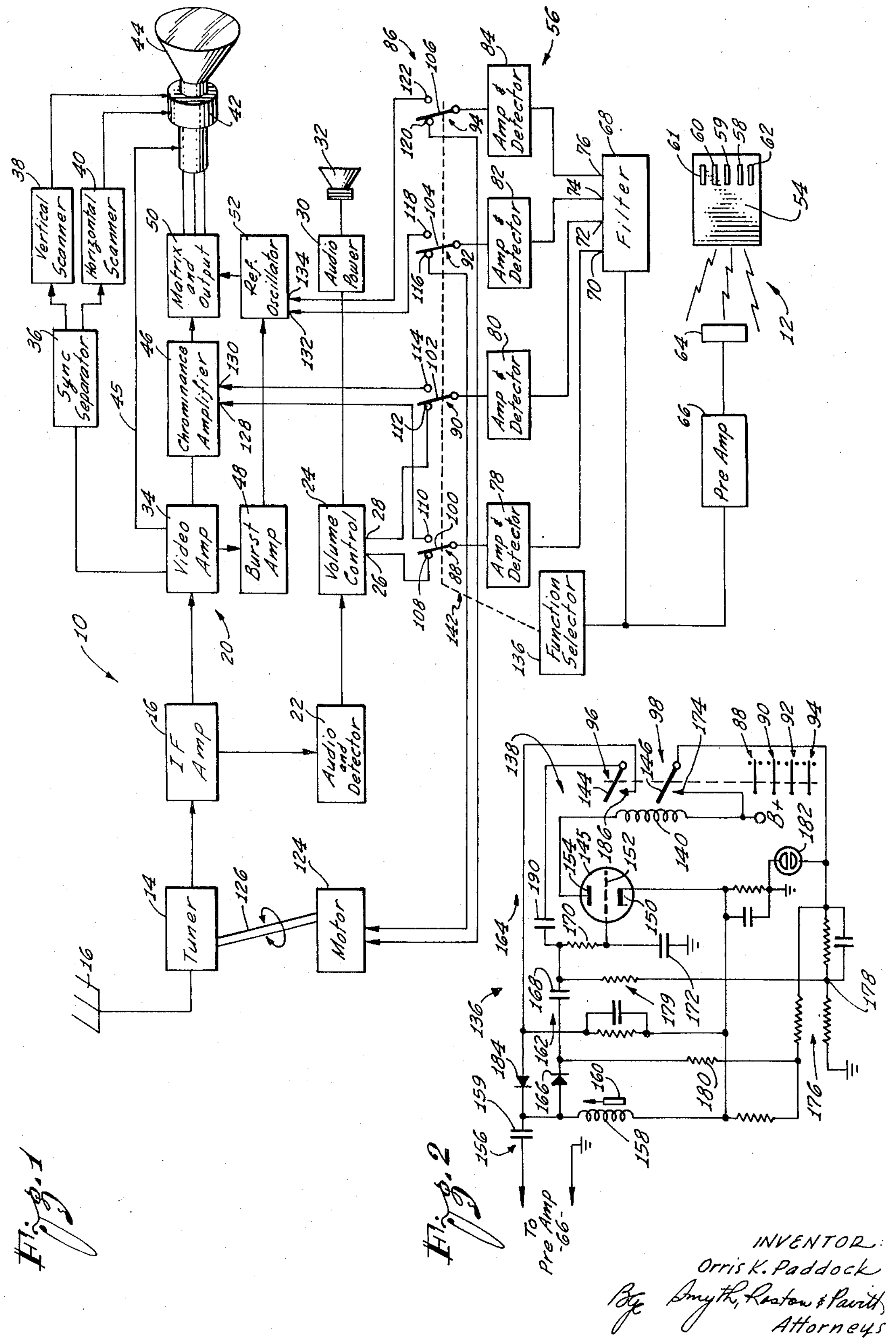

The present invention relates to remote control systems, and more particularly to means for remotely controlling a large number of functions such as the controls in a television receiver.

It is frequently desirable to be capable of controlling various apparatus from a distance. For example, when watching a television receiving set, the viewer is normally located a substantial distance from the receiver. If it is desired to make adjustments to the television receiver by means of controls located on the receiver, it is necessary for the viewer to move to the vicinity of the receiver. This is inconvenient and eliminates the advantage of being able to observe the adjustments from the normal viewing area. In order to enable the viewer to remotely adjust one or more of the controls in the receiver from a distance viewing location, various forms of remote control systems have been provided. In the more common and widely accepted systems, an ultrasonic transmitter radiates sonic signals to the television receiver. The television receiver includes a remote control receiver that is responsive to the sonic signals. In addition, suitable motors, relays, etc., are provided that are actuated by the remote control receiver when the sonic signals are received to make the desired adjustments to the receiver.

The sonic transmitter normally employs a plurality of tuning rods or other signal generating means capable of providing and transmitting sonic signals. Since each tuning rod can vibrate at only one frequency, heretofore it has been necessary to provide a separate tuning rod for each function to be controlled. In the event the function is to be adjusted in opposite directions, it is necessary to employ a pair of signal generating means for each function. Such a remote control system is practical and reasonably convenient where there are a small number of functions to be controlled, for example, the volume and channel selection. However, where there are a large number of functions to be controlled, for example in a color television receiver, the large number of tuning rods or other signal generating means required heretofore has caused the transmitters to be expensive, bulky and difficult to use. In addition, the remote control receiver heretofore has required separate means for sensing each of the separate signals being employed. This, in turn, has resulted in the receiver being very complex and expensive. As a result, although the foregoing remote control systems have been reasonably satisfactory for a black and white television set, when they have been adapted for remotely controlling the large number of adjustments in a color television receiver, they have been unsatisfactory for several reasons. For example, the transmitters have been complex and inconvenient to use and the receivers have required a large number of parts. This, in turn, has made the receiver expensive and unreliable in use.

It is now proposed to provide a remote control system which will overcome the foregoing difficulties. More particularly, it is proposed to provide a remote control system employing a transmitter which is small, compact, trouble-free and easy to use and a remote control receiver which is less expensive and more reliable in operation. This is to be accomplished by providing a transmitter and receiver which include a plurality of controls effective to make a series of adjustments of the various functions. In addition, the transmitter and receiver include function selectors effective to switch the receiver from one state to another state. Each of the signal generating means in the transmitter and the controls in the receiver will thus be effective to regulate or adjust a plurality of functions. As a consequence, the number of necessary parts in the transmitter and receiver and the cost of the remote control system are reduced.

These and other features and advantages of the present invention will become readily apparent to persons skilled in the art from reading the following detailed description of a limited number of embodiments thereof, particularly when taken in connection with the accompanying drawings wherein like reference numerals refer to like parts, and wherein:

FIGURE 1 is a block diagram of a television receiver and control means therefor embodying one form of the present invention; and FIGURE 2 is a wiring diagram of a portion of the control means of FIGURE 1.

Referring to the drawings in more detail, the present invention is particularly adapted to be embodied in a television receiver 10 and a control system 12 for controlling the operation of the receiver 10. Although the receiver 10 may be of any desired variety, in the present instance it is a so-called color receiver.

The input to the present television receiver 10 includes a tuner 14 connected to an antenna 16 for receiving a plurality of electromagnetic signals. The tuner 14 is adapted to be tuned to the frequencies of the various stations or channels to be received. The tuner 14 may be of the so-called turret type. In such a tuner 14 a turret carrying a plurality of separate sets of coils thereon is connected to a rotatable shaft. By rotating the shaft, a preselected set of coils may be rotated into an operative position. Each of the sets of coils is tuned to a single channel or station that is to be received.

As a consequence, by rotating the shaft and the turret to position the preselected set of coils in the operative position, the tuner 14 will be tuned to the desired station or channel. In addition, each set of coils may include a coil that controls the frequency of a local oscillator. The oscillator will always be tuned to oscillate at a frequency which is displaced from the frequency of the selected station by a predetermined amount equal to the intermediate frequency of the receiver.

The output of the tuner 14 is connected to the input of a so-called intermediate frequency or IF amplifier 16. This amplifier 16 is effective to amplify the intermediate frequency signal to a more useful level. One output from the IF amplifier 16 leads to an audio branch 18 while a second output leads to a video branch 20. The audio branch 18 may be of any conventional design and in the present instance includes an audio amplifier-detector 22. This is effective to detect the audio portion of the intermediate frequency signal and to amplify that portion to provide an audio signal corresponding to the picture to be produced.

The output of the amplifier-detector 22 is interconnected with an audio volume control 24 for regulating the volume of the audio signal. This volume control 24 may be of any suitable variety that is effective to control the volume of an audio signal passing therethrough. For example, it may be similar to the volume control means disclosed and claimed in copending application Ser. No. 148,118, filed Oct. 27, 1961, in the names of Fred M. Hayden and Orris K. Paddock and assigned of record to Packard-Bell Electronics Corporation. More particularly, the volume control 24 may include a first variable resistance such as a potentiometer that may be manually adjusted in one direction to decrease the volume and in the opposite direction to increase the volume.

In addition, a second variable resistance may be electrically disposed effectively in parallel to or in series with the first potentiometer. By adjusting the second resistance, the volume of the sound may also be varied. The second resistance may include a stepping relay or similar device that will be effective to vary the resistance in resonse to the signal on inputs 26 and 28. A pulse on the input 26 will be effective to vary the resistance in a direction that will increase the volume while a pulse on the input 28 will vary the resistance in a direction to decrease the volume.

The output from the volume control 24 is connected to one or more stages of audio amplification. The output from the audio amplifier 30 may be connected to a loudspeaker 32. The loudspeaker 32 will thus be driven so as to produce the sound for the video presentation, i.e., the picture.

The video branch 20 may be of any conventional design for producing a video display or picture. In the present instance, the video branch 20 which is particularly adapted to produce a color picture, includes a video amplifier 34. This amplifier 34 is connected to the second output from the IF amplifier 16. This amplifier 34 is effective to receive the video portion of the IF signal and to amplify it to a more useful level.

The video amplifier 34 includes a first output that is interconnected with a sync separator 36. The separator 36 is effective to separate the various synchronizing signals from the video signal. The sync separator 36 includes a pair of outputs that are connected to a vertical sweep circuit 38 and to a horizontal sweep circuit 40. These sweep circuits 38 and 40 are, in turn, connected to a deflection yoke 42 in a cathode ray picture tube 44 capable of producing color displays. It may thus be seen that the electron beams will be synchronously scanned across the face of the tube 44 to form a raster thereon.

The video amplifier 34 includes an output that is connected to a control grid in the picture tube 44 by the channel 45. This channel will be effective to supply a video signal to the tube 44 so as to produce a black and white picture. The video amplifier 34 also includes an output that is connected to a chrominance amplifier 46 and an output that is connected to a burst amplifier 48. The chrominance amplifier 46 is, in turn, connected to the input of a matrix and output circuit 50. The burst amplifier 48 is connected to the input of a reference oscillator 52 which is connected to an input to the matrix and output circuit 50.

The matrix and output circuit 50 is connected to the control electrodes in the three electron guns in the cathode ray tube 44. This will be effective to control the intensity of the electron beams as they are scanned across the raster on the face of the tube 44. It may thus be seen that the video branch 20 will be effective to produce a color picture on the face of the tube 44.

In order to control the color of the picture being displayed, a suitable gain control may be provided in the chrominance amplifier 46. To control the hue of the picture, a suitable control may be provided, in the reference oscillator 52 so as to vary the phase of the oscillator 52 or to vary the phase of the received 3.58 mc. reference signal.

It may thus be seen that the present television receiver 10 will be effective to produce a color picture on the face of the tube 44 and the sound for the picture on the loudspeaker 32. The operator of the receiver may adjust the receiver by manually manipulating various control knobs projecting from the receiver 10. As may be appreciated, a large number of adjustments may be made to a television receiver of this type. However, the most common adjustments include adjusting the tuner 14 to select the channel, adjusting the volume control 24 to regulate the sound, adjusting the chrominance amplifier 46 to control the color gain and adjusting the reference oscillator 52 to control the hue.

In order for a viewer to make the foregoing adjustments by means of controls on the receiver 10, it is necessary for the operator to be within reach of the receiver 10. To make such adjustments more convenient and to provide the advantage of making the adjustments from the viewing area, it is desirable to provide a remote control system 12. Such a system 12 will permit an operator making adjustments to the receiver 10 even though he may be a substantial distance from the receiver.

The present remote control system 12 includes a remote control transmitter 54 that may be carried by the operator and a remote control receiver 56 located at or near the television receiver 10.

The remote control transmitter 54 may be enclosed within a housing that is of a size and shape suitable for being held in the operator's hand. A plurality of control elements 58, 59, 60, 61 and 62 may project from the housing for being manipulated by an operator holding the transmitter 54 in his hand. When the operator manipulates these controls 58, 59, 60, 61 and 62, an appropriate signal will be radiated from the transmitter 54 to the remote control receiver 56. Although these signals may be of any desired variety, it has been found convenient to employ ultrasonic energy in a frequency range of about 30 to 40 kilocycles. One means of generating signals of this nature includes a plurality of tuning rods or similar devices that will mechanically vibrate at predetermined ultrasonic frequencies.

In the present instance, the transmitter 54 includes five tuning rods of different frequencies. By moving the first control 58 in one direction, the first tuning rod is struck whereby a command signal of a first frequency will be radiated.

Similarly, the second control 59 may be moved in one direction to cause a second tuning rod to radiate a command signal of a second frequency. The third control 60 may be manipulated to strike a third tuning rod whereby a signal of a third frequency will be radiated. Similarly, the controls 61 and 62 may be manipulated to strike fourth and fifth tuning rods to produce fourth and fifth signals. It should be noted that although tuning rods and ultrasonic signals are specifically mentioned, other forms of signal generators and/or other forms of signals such as modulated carrier waves may be employed.

The remote control receiver 56 may be integral with the television receiver circuit. However, it has been found desirable for the remote control receiver 56 to be mounted on its own chassis so as to be a self-contained unit. This will permit the remote control receiver 56 being installed at the time the receiver 10 is originally manufactured or subsequently added thereto with no difficulty.

The input to the receiver 56 includes a transducer 64 for sensing command signals. Although the command signals for controlling the receiver 56 may be of any suitable variety, as previously stated in the present instance they are ultrasonic signals having frequencies in the range of about 30 to 40 kilocycles per second. Accordingly, the transducer 64 may be a device such as a microphone capable of receiving ultrasonic command signals radiated from the transmitter 54.

When the transducer 64 is subjected to a command signal from the transmitter 54, it will produce an electrical signal that will be a pulse having a frequency and time duration substantially identical to the command signal. The transducer 64 is interconnected with the input to an amplifier 66 that will be effective to amplify the electrical signal to a more useful level.

The output of the preamplifier 66 may be interconnected with the input to a filter 68 for supplying the amplified electrical signals thereto. The filter 68 may include a plurality of separate bandpass sections and a separate output 70, 72, 74 and 76 for each of the sections. Each of the sections is tuned to a frequency of one of the command signals radiated so that a signal will be present on one of the outputs only when a signal of that particular frequency is radiated. In the event that the signals are in the form of a carrier wave of a particular frequency modulated by the command signals, the filter 68 will be a demodulator and/or filter capable of separating the command signals from the carrier.

More particularly, when the first, second, third or fourth controls 58, 59, 60 or 61 are manipulated to produce a signal on one of the first, second, third or fourth frequencies, the bandpass sections will produce signals on the first, second, third or fourth outputs 70, 72, 74 and 76, respectively. The signals on the outputs 70 to 76, inclusive, will be pulses having the same frequencies as the signals from the amplifier.

Each of the outputs 70 to 76, inclusive, from the filter 68 is interconnected with the input to a combined amplifier-detector 78, 80, 82 and 84. Each of the amplifier-detectors 78, 80, 82 and 84 is effective to detect the A.C. signals present on its respective filter output and produce a D.C. pulse corresponding thereto. The output from each of the amplifier-detectors 78 to 84, inclusive, is connected to a suitable switch means 86. In the present instance, the switch means 86 includes a plurality of banks 88, 90, 92, 94, 96 and 98 that are ganged together. The banks 88 to 94, inclusive, include movable contacts 100, 102, 104 and 106 and pairs of fixed contacts 108–110, 112–114, 116–118 and 120–122. The movable contacts 100, 102, 104 and 106 are connected to the outputs from the amplifier-detectors 78, 80, 82 and 84, respectively.

The fixed contact 108 in the first bank 88 may be connected to the first control input 26 of the volume control 24 and the fixed contact 112 in the second bank 90 may be connected to the second control input 28 of the volume control 24. Thus, when the switch means 86 is in the position shown, each pulse from the amplifier-detector 78 will be effective to cause the volume of the signal from the volume control 24 to be increased and each pulse from the amplifier-detector 80 will be effective to cause the volume of the signal from the volume control 24 to be decreased. If the remote control receiver 56 is turned "ON," the first pulse from the amplifier-detector 78 will turn the television receiver "ON." If the control 24 is set to reduce the volume to zero, the next pulse from the amplifier-detector 80 will turn the set "OFF."

The fixed contacts 116 and 120 in the third and fourth banks 92 and 94 are connected to means for adjusting the tuner 14. Although this means may be of any suitable variety, it has been found desirable to employ a reversible electric motor 124 such as a so-called split phase motor. In such a motor, a power or primary winding is provided that encompasses the entire stator. In addition, a forward winding is provided that encompasses only a portion of the stator and is effective to cause the motor to run in the forward direction. A reverse winding is also provided that encompasses only another portion of the stator and is effective to cause the motor to run in the reverse direction.

The rotor of the motor 124 is connected by means of a suitable gear train and/or shaft 126 with the turret in the tuner 14. If the operator manipulates the third control 60 to transmit a signal of the third frequency, a pulse will be produced by the amplifier-detector 82 that will cause the motor 124 to run in the forward direction to increase the frequency to which the tuner 14 is tuned. However, if the control 61 is manipulated to produce a signal of the fourth frequency, the amplifier-detector 84 will cause the motor 124 to run in the reverse direction to decrease the frequency of the signal received.

The second fixed contact 110 in the first bank 88 may be connected to a first control input 128 of the chrominance amplifier 46 and the second fixed contact 114 in the second bank 90 may be connected to a second control input 130 to the amplifier 46. These two inputs 128 and 130 may be connected to means such as a stepping relay that is effective to advance one position each time a signal occurs on the other input. When the relay advances or retreats, it will cause gain of the amplifier 46 to increase or decrease by some predetermined increment. Thus, if the switch means 86 is moved from the position shown to the opposite position, each pulse from the amplifier-detector 78 will now cause the color gain to decrease and each pulse from the amplifier-detector 80 will cause the color gain to increase.

The second fixed contact 118 in the third bank 92 may be connected to a first control input 132 of the reference oscillator 52 and the second fixed contact 122 in the fourth bank 94 may be connected to a second control input 134 to the oscillator 52. These two inputs 132 and 134 may be connected to means such as a stepping relay that is effective to advance one position each time a signal occurs on one input and to retreat one position each time a signal occurs on the other input. When the relay advances or retreats by one position, it will cause the phase of the oscillator 52 to vary by some predetermined increment.

Thus, if the switch means 86 is moved from the position shown to the opposite position, each pulse from the amplifier-detector 82 will change the phase of the oscillator 52 and vary the hue from magenta toward green while a pulse from the amplifier-detector 84 will change the phase to vary the hue in the opposite direction, i.e., from green toward magenta.

In order to control the position of the movable contacts 100, 102, 104 and 106 in the switch means 86, a function selector 136 may be provided. As may be seen in FIGURE 2, the function selector 136 includes a relay 138 having an inductive coil 140 that is effective, when energized, to physically move an armature 142. It should be noted that although the relay 138 and the switch banks 88 to 98 are shown, other forms of switches such as solid state devices may be employed. The armature 142 is mechanically connected to the movable contacts 100 to 106, and the movable contacts 144 and 146 in the banks 96 and 98. Normally, all of the contacts 100 to 106, 144 and 146 will remain in the positions shown. However, when the coil 140 is energized, all of the contacts will move to the opposite positions.

The relay 138 is controlled by a vacuum tube 146 having a cathode 150, a control grid 152 and plate 154. The plate 154 is connected to a positive source of a high voltage by means of the coil 140. It will thus be seen that the energizing current for the relay 138 will be the plate current. The current in the plate 154 will be controlled by the bias on the control grid 152.

The control grid 152 is connected to the output of the amplifier 66 by a suitable circuit whereby the grid 152 will respond to the signal of the fifth frequency, i.e., signals produced by manipulating the function selector element 62 on the transmitter 54. The present circuit includes an input 156 which is adapted to be interconnected directly with the output of the preamplifier 66 so as to receive all of the various command signals therefrom. A filter tuned to the fifth frequency is provided across the input 156. This filter may include a capacitor 159 and an impedance 158 having a slug 160 which tunes this circuit to resonate at the frequency of the function signal. As a consequence, when signals of the first to fourth frequencies are received, little or no voltage will be produced across the tuned impedance 158. However, when a signal of the fifth frequency, i.e., the function frequency, is being received, a voltage signal will develop across the impedance 158.

The circuit includes two branches 162 and 164 that extend from the impedance 158 to the control grid 152 for coupling different portions of the voltage signal across the impedance 158 to the grid 152.

The first branch 162 includes a diode 166, a condenser 168, a resistor 170 and a condenser 172. When a function signal of the fifth frequency is received, the diode 166 will permit only the positive portions of the signal to be coupled through the first branch 162 to the control grid 152. This positive pulse will be of sufficient magnitude to bias the tube 146 conductive. When the tube 146 conducts, it will energize the relay 138 and close the contacts 146 and 174.

The fixed contact 174 is interconnected with the source of $B^+$ voltage while the movable contact 146 is connected to a voltage divider 176 that extends to ground. As a result, when the contacts 146 and 174 close, the $B^+$ voltage will be present across the divider 176 and the junction 178 will be maintained at some predetermined positive potential.

The junction 178 in the divider 176 may be interconnected with the control grid 152 by means of a resistor 179 that leads to the first branch 162. It may thus be seen that when the contacts 146 and 174 close, a positive voltage will be supplied to the control grid 152. This bias voltage will be sufficiently positive to maintain the tube 146 conductive to maintain the relay 138 energized. The cathode of the diode 166 is connected to the contact 146 by means of a resistor 180. This will be effective, when the contacts 146 and 174 are closed, to maintain the cathode sufficiently positive to block the diode 166. As a result, a positive pulse on the impedance 158 will not be coupled through the condenser 168. An indicator lamp 182 such as a neon light may be connected between ground and the movable contact 146. Thus, when the relay 138 is energized and contacts 146 and 174 are positioned opposite to the positions shown, the lamp 182 will be lit. As a consequence, by observing the lamp 182, the operator can quickly determine the state of the function selector 136.

The second branch 164 includes a diode 184 which is also connected to the impedance 158 and to the first diode 166. This diode 184 is similar to the first diode 164; however, it has its cathode connected to the anode of the diode 166. The second diode 184 is connected to the control grid 152 by means of the contacts 144 and 186 and a coupling condenser 190 that leads to the resistor 170.

When a signal of the function frequency is received and a corresponding signal develops across the impedance 158, the diode 184 will permit the negative portions of the signal to flow to the contacts 144 and 186. If the contacts are closed, the negative pulse will flow through the condenser 190 to the control grid 152. This negative pulse will be of sufficient magnitude to bias the tube 146 non-conductive, whereby the relay 138 will be de-energized and the contacts 146, 174 and 186, 144 will open.

In order to employ the present invention for controlling a television receiver 10, the operator may observe the indicator lamp 182 and thereby determine whether or not the function selector 136 is set to permit the desired adjustment to be made. If the selector 136 is not properly set, the operator may manipulate the selector control element 62.

For example, if it is desired to adjust the frequency to which the tuner 14 is set and/or the volume of the receiver, the indicator light 182 should be extinguished. If it is not, the operator may move the control element 62. This will cause a pulse of the fifth frequency to flow from the preamplifier 66 through the impedance 158. Since the impedance 158 and condenser 159 are tuned to this frequency, a voltage pulse will occur across the impedance 158. The negative portions of this pulse will flow through the diode 184 and the closed ocntacts 144–186 to the control grid 152 of the vacuum tube 146. This will cut the tube 146 off whereby the relay 138 will be de-energized and all the movable contacts 100, 102, 104, 106, 144 and 148 will be positioned substantially as shown. Among other things, this will remove the $B^+$ voltage from the indicator lamp 182. The operator can then observe that the function selector 136 is now set so that he can now adjust the volume control 24 and the tuner 14. Also, the resisor 180 will no longer apply a positive voltage to the cathode of diode 166.

In order to adjust the volume, the operator may manipulate the first control element 58 on the transmitter 54 to produce signals of the first frequency. This will cause a signal at the output of the filter 68 to be coupled through the amplifier-detector 78 and the contacts 100–108 to the first control input 26 of the volume control 24. This will increase the volume of the sound by some predetermined increment. If the operator manipulates the second control element 59 to produce a command signal of the second frequency, a signal will be coupled from the second output 72 of the filter 68 through the amplifier-detector 80 and the fixed contact 112 to the second control input 28 to the volume control 24. This, in turn, will cause the volume to be decreased by some predetermined increment.

In the event that the operator desires to change the channel to which the receiver 10 is tuned, he may manipulate the third control element 60 on the transmitter 54 to transmit a signal of the third frequency. This will cause a signal to be produced at the third output 74 of the filter 68. This signal will flow through the amplifier-detector 82 and fixed contact 116 to the motor 124. The motor 124 will then run in the forward direction and advance the tuner 14 to the next higher channel. If the operator manipulates the control element 61, a signal of the fourth frequency will be radiated to the transducer 64. This will cause a signal to be present on the fourth output 76 of the filter 68. This signal will travel through the amplifier-detector 84 and fixed contact 120 to the motor 124. This, in turn, will cause the motor 124 to run in the opposite direction whereby the tuner 14 will be adjusted to a channel of a lower frequency.

If after selecting the desired channel and adjusting the sound to the desired level it is desirable to adjust the color portion of the receiver 10, the operator may also accomplish this from the remote location if the indicator lamp 182 is "ON." If it is not "ON" the operator may manipulate the function selector control 62 to transmit a signal of the fifth frequency. This will produce an electrical signal of the same frequency and time duration at the output of the amplifier 66 and the input 156 to the function selector 136. Since the inductance 158 is tuned to the frequency of this signal, a voltage pulse will appear across the inductance 158. At this time, the contacts 144–186 will be open so that a negative pulse cannot be coupled through the diode 184 to the tube 146.

A positive pulse will be coupled through the diode 166 to the control grid 152. This pulse will be of sufficient magnitude to bias the tube 146 conductive. When the tube 146 conducts, it will energize the relay 138 and move all of the movable contacts 100, 102, 104, 106, 144 and 146 to a position opposite from that shown. When the contacts 146 and 174 close, the positive voltage from $B^+$ of plate supply will be connected across the voltage divider 176. The voltage at the junction 178 will be carried over the resistors 179 and 170 to the control grid 152. This voltage is sufficiently positive to produce a plate current that will maintain the relay 138 energized and the contacts 144 and 146 retained in their new position. A postive voltage will be fed via the resistor 180 to the cathode of the diode 166 so as to block the passage of any further positive pulses.

As a consequence, the selector 136 is in a stable state that may be maintained indefinitely. As long as the contacts 146 and 174 remain closed, the B+ voltage will be applied across the neon lamp 182. This will indicate that the color portion of the receiver 10 may be adjusted.

In order to adjust the gain, the operator may now manipulate the first control 58 in the transmitter 54 to ransmit a signal of the first frequency. This will be effective to produce a corresponding electrical signal on the first output 70 of the filter 68 and in the first amplifier-detector 78. This signal will flow through the movable contact 100 to fixed conact 110 to the first input 128 of the chrominance amplifier 46. Each time a pulse is applied to this input 128, the gain of the amplifier 46 will be increased. If the reverse adjustment is desired, the operator may manipulate the second control 59 in the transmitter 54 whereby a signal of the second frequency will be transmitted. This will result in a corresponding signal on the second output 72 of the filter 68 and the second amplifier-detector 80. This signal will then flow through the second fixed contact 114 in the second bank 102 to the second control input 130 of the chrominance amplifier 46 whereby the gain of the amplifier 46 will be decreased.

If the operator desired to adjust the hue, he may manipulate the third control element 60 in the transmitter 54 so as to transmit a signal of the third frequency or the fourth frequency if the fourth control 61 is manipulated. If the transmitted signal is of the third frequency, a signal will be present on the third output 74 of the filter 68 and in the third amplifier-detector 82. This signal will flow through the fixed contact 118 in the third bank 92 to the first input 132 of the reference oscillator 52. This will be effective to vary the phase of the oscillator 52 so that the hue will be shifted from magenta toward green. However, if the operator manipulates the control element 61, the signal will be present on the fourth output 76 and in the fourth amplifier-detector 84. This signal will then flow through the fixed contact 122 in the fourth bank 94 to the reference oscillator 52. This will cause the phase of the oscillator 52 to shift in the opposite direction and change the hue from green toward magenta.

In the event the operator desires to again change the channel to which the receiver 10 is tuned, or adjust the volume of the sound, he may merely manipulate the function control 62 so as to produce a function signal. This will produce a voltage across the inductance 158 whereby a negative pulse will flow through the diode 184. However, the contacts 146 and 174 will cause a positive voltage to flow through the rseistor 180 to block the diode 166 and prevent any positive pulses reaching the grid 152. Since the relay 138 was previously energized, the contacts 144 and 186 will be closed. The negative pulse may then flow through the contacts to the grid 152 and cut the vacuum tube 146 off. This will restore all of the contacts to the position shown. The operator may now adjust the volume and channel by manipulating controls 58, 59, 60 and 61 as described above.

It will thus be seen that a substantial number of functions may be adjusted by means of the present control system. However, the transmitter is greatly simplified since it does not have a large number of tuning rods, etc. Also, the remote control receiver is simplified and has a smaller number of parts than has been required heretofore.

While only a single embodiment of the present invention is disclosed and described herein, it will be readily apparent to persons skilled in the art that numerous changes and modifications may be made without departing from the scope of the invention. For example, the type of transmitter and receiver and the form of signal may be of any suitable variety. The function selector 62 instead of being bistable may be effective to condition switch means between a plurality of states whereby each of the controls 58 to 61 may actuate a large number of controls. Also, although the present embodiment is described as making certain adjustments on a color television receiver, it may be used to adjust any other function such as contrast, brightness, etc. Accordingly, the foregoing disclosure and description thereof are for illustrative purposes only and do not in any way limit the invention which is defined only by the claims which follow.

What is claimed is:

1. In a system for controlling the adjustment of a plurality of adjustable means in response to a first command signal of a first character and to a second command signal of a second character transmitted by a transmitter, the combination of:

a first control interconnected with a first adjustable means in said plurality of adjustable means for controlling the adjustment of said first means, a second control interconnected with a second adjustable means in said plurality of adjustable means for controlling the adjustment of said second means, a receiver for receiving the command signals transmitted by said transmitter, said receiver being responsive to the individual command signals to provide first control signals each time that a command signal of the first character is received and to provide second control signals each time that a command signal of the second character is received, switch means interconnected with said receiver and actuatable between a first state and a second state, said switch means when in the first state interconnecting said receiver with the first control to transfer the first control signal from the receiver to the first control and when in the second state interconnecting said receiver with the second control to transfer the first control signal from said receiver to the second control, and a function selector interconnected with said receiver and responsive to the second control signals, said function selector being interconnected with said switch means to actuate said switch means from one of said states to the other of said states in response to the second control signals.

2. In a system for controlling the adjustment of a plurality of adjustable means in response to a first command signal of a first character and to a second command signal of a second character transmitted by a transmitter, the combination of:

a receiver for receiving the command signals transmitted by said transmitter, said receiver being responsive to the individual command signals to provide first control signals each time that a command signal of the first character is received and to provide second control signals each time that a command signal of the second character is received, a first control interconnected with a first one of the adjustable means in said plurality of adjustable means for controlling the adjustment of said first means in response to said first control signals, a second control interconnected with a second one of the adjustable means in said plurality of adjustable means for controlling the adjustment of said second control in response to said first control signal, switch means interconnected with said receiver and actuatable between a first state and a second state, said switch means when in the first state interconnecting said receiver with the first control to transfer the first control signal from the receiver to the first control and when in the second state interconnecting said receiver with the second control to transfer the first control signal from said receiver to the second control, a function selector interconnected with said receiver and responsive to the second control signal, said function selector being interconnected with said switch means to actuate said switch means from one of said states to the other of said states in response to the second control signals, and holding means interconnected with said switch means for retaining said switch means in the state it is in until the next second control signal is received.

3. In a system for separately controlling the adjustments of a plurality of adjustable means in a plurality of groups of adjustable means, the combination of:

a transmitter for transmitting a function signal and separate command signals for each of the adjustable means in one of said groups, a receiver for receiving the signals transmitted by said transmitter, a separate group of controls for each group of adjustable means, each of said groups of controls including a separate control for each adjustable means in the respective group of adjustable means, each of said controls being effective to separately control the adjustment of one of said adjustable means, filter means interconnected with said receiver, said filter means including a separate section for each of the adjustable means in one of said groups, each of said sections being responsive to its respective command signal to provide a separate control signal each time that its respective command signal is received, a separate switch means for each of the sections in said filter means, each of said switch means being interconnected with its respective section and actuatable into a separate state for each group of adjustable means, said switch means when in said states being effective to interconnect respective sections in said filter means with the respective control in the successive groups of controls to transfer the control signal from the receiver to the respective controls in the groups, and a function selector interconnected with said receiver and responsive to the function signal, said function selector being interconnected with said switch means to simultaneously actuate said switch means from one of said states to the other of said states in response to the function signal.

4. In a system for separately controlling the adjustments of a plurality of adjustable means in a first group and the adjustments of a plurailty of adjustable means in a second group, the combination of:

a transmitter for transmitting a function signal and a separate command means for each of the adjustable means in one of said groups, a first group of controls, and said first group of controls including a separate control for each of the adjustable means in said first plurality of adjustable means, each of said controls being effective to individually control the adjustment of one of said means in said first plurality, a second group of controls, said second group of controls including a separate control for each of the adjustable means in said second plurality of adjustable means, each of said controls being effective to individualy control the adjustment of one of said means in said second plurality, a receiver for receiving the signals transmitted by said transmitter, filter means interconnected with said receiver, said filter means including a separate section for each of the adjustable means in one of said groups, each of said filter sections being responsive to a distinctive command signal to provide a separate control signal each time that its distinctive command signal is received, a separate switch means for each of the sections in said filter means, each of said switch means being interconnected with its respective section and actuatable between a first state and a second state, said switch means when in the first state being effective to interconnect its respective filter section with its respective control in the first group of controls to transfer the control signal from the receiver to the respective control in the first group, said switch means when in the second state being effective to interconnect its respective filter section with its respective control in the second group of controls to transfer the control signal from the receiver to the respective control in the second group, and a function selector interconnected with said receiver and responsive to the function signal, said function selector being interconnected with said switch means to simultanously actuate said switch means from one of said states to the other of said states in response to the function signal.

5. In a system for separately controlling the adjustments of a plurality of adjustable means in a first group and the adjustments of a plurality of adjustable means in a second group, a transmitter for transmitting a function signal and a separate command means for each of the adjustable means in one of said groups, a receiver for receiving the signals transmitted by said transmitter, filter means interconnected with said receiver, said filter means including a separate section for each of the adjustable means in one of said groups, each of said sections being responsive to a different one of the command signals to provide a separate control signal each time that its respective command signal is received, a separate switch means for each of the sections in said filter means, each of said switch means being interconnected with its respective section and actuatable betwen a first state and a second state, a first group of controls having a separate control for each of said switch means, each of said controls in said first group of controls being interconnected with its respective adjustable means in the first group of adjustable means for separately controlling the adjustment of its means in response to a command signal, a second group of controls having a separate control for each of said switch means, each of said controls in said first group of controls being interconnected with its respective adjustable means in said second plurality of adjustable means for separately controlling the adjustment of its means in response to a command signal, said switch means when in the first state being effective to interconnect its respective filter section with its respective control in said first group of controls to transfer the control signal from the receiver to the respective control in the first group, said switch means when in the second state being effective to interconect its respective filter section with its respective control in the second group of controls to transfer the control signal from the receiver to its respective control in the second group, and a function selector interconnected wtih said receiver and responsive to the function signal, said function selector being interconnected with said switch means to simultaneously actuate said switch means from one of said states to the other of said states in response to the function signal.

6. In a control system having a transmitter for transmitting comand signals of a first predetermined frequency and command signals of a second predetermined frequency, the combination of:

a receiver for receiving the command signals from said transmitter, first frequency responsive means interconnected with said receiver, said first frequency responsive means being responsive to the command signals of the first predetermined frequency to provide a first control signal each time a command signal of the first frequency is received, switch means interconnected with said frequency responsive means and having a first state and a second state, first output means, a first control interconnected with said switch means and with said first output means for actuating said output means, second output means, a second control interconnected with said switch means and with said second output means for actuating said second output means, said switch means when in the first state being effective to transfer the first control signals from said first frequency responsive means to the first control and when in the second state being effective to transfer the first control signals from said first frequency responsive means to the second control, second frequency responsive means interconnected with said receiver, said second frequency responsive means being responsive to the command signals of the second predetermined frequency, said second frequency responsive means being interconnected with said switch means to change said switch means from one of said states to the other of said states in response to the command signals of said second frequency.

7. In a control system, the combination of:

a transmitter for transmitting a plurality of command signals of predetermined differing frequencies and a function signal of a predetermined frequency, a receiver for receiving the signals from said transmitter, first frequency responsive filter means interconnected with said receiver, said filter means having a separate section for each of the command signals, each of said sections being effective to provide a control signal each time a command signal is received that has a frequency corresponding to the frequency of the section, separate switch means for each of the sections in said filter means, each of the switch means being interconnected with a separate one of said frequency responsive means and having a first state and a second state, a first group of controls, each of the controls in said group being interconnected with a separate one of said switch means, a second group of controls, each of the controls in said second group being interconnected with a separate one of said switch means, each of said switch means when in one of said states being effective to transfer the control signals from its filter section to its respective control in the first group and when in the other of said states being effective to transfer the control signals from its respective filter section to its respective control in the second group, and second frequency responsive means interconnected with said receiver, said second frequency responsive means being responsive to the frequency of the function signals, said second frequency responsive means being interconnected with said switch means to change said switch means from one of said states to the other of said states in response to the function signals.

8. In a control system, the combination of:

a transmitter for transmittting a plurality of command signals of predetermined differing frequencies and a function signal of a predetermined frequency, a receiver for receiving the signals from said transmitter, first frequency responsive filter means interconnected with said receiver, said filter means having a separate section for each of the command signals, each of said sections being effective to provide a control signal each time a command signal is received that has a frequency corresponding to the frequency of the section, separate switch means for each of the sections in said filter means, each of the switch means being interconnected with a separate one of said frequency responsive means and having a first state and a second state, a first group of controls, each of the controls in said group being interconnected wtih a separate one of said switch means, a second group of controls, each of the controls in said second group being interconnected with a separate one of said switch means, each of said switch means when in one of said states being effective to transfer the control signals from its filter section to its respective control in the first group and when in the other of said states being effective to transfer the control signal from its respective filter section to its respective control in the second group, second frequency responsive means interconnected with said receiver, said second frequency responsive means being responsive to the frequency of the function signals, said second frequency responsive means being interconnected with said switch means to change said switch means from one of said states to the other of said states in response to the function signals, and holding means interconnnected with said switch means for retaining said switch means in the state it is in until the next function signal is received.

9. In a television set having a first group of adjustable means for controlling the operation of a portion of the television set and a second group of adjustable means for controlling the operation of another portion of the set, a remote control system for adjusting said adjustable means in respnse to command signals of differing character transmitted by a transmitter, said remote control system including the combination of:

a remote control receiver for receiving the command signals transmitted by said transmitter, said remote control receiver being responsive to the individual command signals from said transmittter to provide a first control signal each time that a command signal of a first character is received and to provide a second control signal each time that a command signal of the second character is received, a first control interconnected with a particular adjustable means in said first group of adjustable means for controlling the adjustment of that particular means in response to said first control signals, a second control interconnected with a particular adjustable means in said second group of adjustable means for controlling the adjustment of that particular means in response to said first control signals, switch means interconnected with said remote control receiver and actuatable between a first state and a second state, said switch means when in the first state being effective to interconnect said remote control receiver with the first control to transfer the first control signals from the remote control receiver to the first control to cause said first control to adjust the particular means in the first group, said switch means when in the second state being effective to interconnect said remote control receiver with the second control to transfer the first control signals from said receiver to the second control to cause said second control to adjust the particular means in the second group, and a function selector interconnected with said remote control receiver and responsive to the second control signals, said function selector being interconnected with said switch means to actuate said switch means from one of said states to the other of said states in response to the second control signals.

10. In a television set having a first group of adjustable means for controlling the operation of a portion of the television set and a second group of adjustable means for controlling the operation of another portion of the set, a remote control system for adjusting said means in response to command signals transmitted by a transmitter and having a first frequency and having a second frequency, said remote control system including the combination of:

a remote control receiver for receiving the command signals transmitted by said transmitter, filter means interconnected with said remote control receiver and being responsive to the individual command signals, said filter means including a first portion to provide a first control signal each time that a command signal of the first frequency is received and a second portion to provide a second control signal each time that a command signal of the second frequency is received, a first control interconnected with a particular adjustable means in said first group of adjustable means for controlling the adjustment of that particular means in the first group in response to said first control signals, a second control interconnected with a particular adjustable means in said second group of adjustable means for controlling the adjustment of the second particular means in the second group in response to said first control signals, switch means interconnected with the first portion of said filter means and actuatable between a first state and a second state, said switch means when in the first state being effective to interconnect said first portion of said filter means with the first control to transfer the first control signals from the remote control receiver to the first control, said switch means when in the second state being effective to interconnect said first portion of said filter means with the second control to transfer the first control signals from said receiver to the second control, and a function selector interconnected with the second portion of the filter means and responsive to the second control signals, said function selector being interconnected with said switch means to actuate said switch means from one of said states to the other of said states in response to the second control signals.

11. In a television receiving set having a portion for producing a picture display and a portion for producing colors in said picture display, the combination of:

a first group of adjustable means in the first portion of said receiving set for controlling the operation of the first portion, a second group of adjustable means in the second portion of said receiving set for controlling the colored portion of the picture display, a transmitter for transmitting to said television receiving set a first command signal of a first character and to a second command signal of a second character, a remote control receiver in said television receiving set for receiving the command signals transmitted by said transmitter, means in the remote control receiver responsive to the individual command signals to provide a first control signal each time that a command signal of the first character is received and to provide a second control signal each time that a command signal of the second character is received, a first control interconnected with a particular adjustable means in said first group of adjustable means for controlling the adjustment of that particular means in the first group in response to the first control signals, a second control interconnected with a particular adjustable means in said second group of adjustable means for controlling the adjustment of said second particular means in response to first control signals, switch means interconnected with said remote control receiver and actuatable between a first state and a second state, said switch means when in the first state being effective to interconnect said remote control receiver with the first control to transfer the first control signals from the remote control receiver to the first control to cause said first control to adjust the particular means in the first group, said switch means when in the second state being effective to interconnect said remote control receiver with the second control to transfer the first control signals from said receiver to the second control to cause the second control to adjust the particular means in the second group, and a function selector interconnected with said remote control receiver and responsive to the second control signals, said function selector being interconnected with said switch means to actuate said switch means from one of said states to the other of said states in response to the second control signals.

12. In a television receiving set having a portion for producing a picture display and a portion for producing colors in said picture display, the combination of:

a first group of adjustable means in the first portion of said receiving set for controlling the operation of the first portion of the television receiving set, a second group of adjustable means in the second portion of said receiving set for controlling the operation of the second portion of the receiving set, a remote control transmitter for transmitting to said television receiver a first command signal of a first frequency and a second command signal of a second frequency, a remote control receiver for receiving the command signals transmitted by said transmitter, filter means interconnected with said remote control receiver and being responsive to the individual command signals, a first section in the filter means responsive to the first frequency to provide a first control signal each time a first command signal is received, a second section in the filter means responsive to the second frequency to provide a second control signal each time that a second command signal is received, a first control interconnected with a particular adjustable means in said first group of adjustable means for controlling the adjustment of the particular means in response to said first control signals, a second control interconnected with a particular adjustable means in said second group of adjustable means for controlling the adjustment of the second particular means in response to said first control signals, switch means interconnected with the first section of said filter means and actuatable between a first state and a second state, said switch means when in the first state being effective to interconnect the first section of said filter means with the first control to transfer the first control signals from the filter means to the first control, said switch means when in the second state being effective to interconnect the first section of said filter means with the second control to transfer the first control signals from the filter means to the second control, and a function selector interconnected with the second section of the filter means and responsive to the second control signals, said function selector being interconnected with said switch means to actuate said switch means from one of said states to the other of said states in response to the second control signals.

References Cited by the Examiner

UNITED STATES PATENTS 2,817,025 12/1957 Adler ---------------- 325—391

KATHLEEN H. CLAFFY, *Primary Examiner.*

R. P. TAYLOR, *Assistant Examiner.*